US012780124B2

(12) United States Patent
Andal et al.

(10) Patent No.: US 12,780,124 B2
(45) Date of Patent: Nov. 3, 2026

(54) SYSTEMS AND METHODS FOR VOLTAGE COMPENSATION FOR SEAT BOXES IN TRANSPORTATION VEHICLES

(71) Applicant: Panasonic Avionics Corporation, Irvine, CA (US)

(72) Inventors: Ian Andal, Irvine, CA (US); Kevin Mendoza, Irvine, CA (US); Yichao Jiang, Irvine, CA (US)

(73) Assignee: Panasonic Avionics Corporation, Irvine, CA (US)

( * ) Notice: Subject to any disclaimer, the term of this patent is extended or adjusted under 35 U.S.C. 154(b) by 233 days.

(21) Appl. No.: 18/677,765

(22) Filed: May 29, 2024

(65) Prior Publication Data

US 2025/0370490 A1 Dec. 4, 2025

(51) Int. Cl.

| | |
|---|---|
| ***B60L 1/00*** | (2006.01) |
| ***B60R 16/03*** | (2006.01) |
| ***B64D 11/06*** | (2006.01) |
| ***G05F 1/46*** | (2006.01) |

(52) U.S. Cl.

CPC ................ *B60R 16/03* (2013.01); *B60L 1/00* (2013.01); *B60L 1/006* (2013.01); *B64D 11/0624* (2014.12); *G05F 1/462* (2013.01)

(58) Field of Classification Search

CPC . B60L 1/00; B60L 1/006; B60R 16/03; B64D 11/0624; G05F 1/462

See application file for complete search history.

(56) References Cited

U.S. PATENT DOCUMENTS

| | | | | |
|---|---|---|---|---|
| 6,016,016 A * | 1/2000 | Starke | ................ | B64D 11/0624 710/302 |
| 10,955,865 B1 * | 3/2021 | N M | ......................... | H03F 1/38 |
| 2003/0042971 A1 * | 3/2003 | Oikawa | ..................... | G05F 1/56 327/540 |
| 2003/0148788 A1 * | 8/2003 | Kwak | ............... | H04M 1/72409 455/554.2 |
| 2012/0032517 A1 * | 2/2012 | Ido | ...................... | H02M 3/3376 307/77 |
| 2013/0167817 A1 * | 7/2013 | Bauer | ................... | H02J 50/402 123/621 |
| 2017/0025803 A1 * | 1/2017 | Abbinante | ......... | B64D 11/0015 |
| 2019/0328141 A1 * | 10/2019 | Cheng | ...................... | A47C 7/72 |

* cited by examiner

*Primary Examiner* — Levi Gannon
(74) *Attorney, Agent, or Firm* — LOZA & LOZA, LLP

(57) ABSTRACT

Systems and methods are provided for a transportation vehicle. A system includes a power delivery component comprising a power delivery port and a power meter component to measure a power delivery component voltage received at the power delivery component via a cable, and a seat box connected to the power delivery component via the cable and configured to provide a supply voltage to the power delivery component via the cable. The seat box comprises a DC-to-DC converter to convert an initial DC voltage to a seat box DC voltage, a voltage compensation component to change the seat box DC voltage to the supply voltage, and a microcontroller configured to receive the power delivery component voltage from the power meter component, determine a voltage drop across the cable based on the power delivery component voltage, and control the voltage compensation component to adjust the supply voltage based on the voltage drop.

20 Claims, 8 Drawing Sheets

SYSTEMS AND METHODS FOR VOLTAGE COMPENSATION FOR SEAT BOXES IN TRANSPORTATION VEHICLES

TECHNICAL FIELD

The present disclosure relates to aircraft in general, and more particularly, to technology for voltage compensation in seat devices of a transportation vehicle to adjust a voltage provided to one or more components within seats of the transportation vehicle.

BACKGROUND

Transportation vehicles, for example, aircraft, trains, buses, recreation vehicle, boats and other similar vehicles use various computing devices for providing various functions, including entertainment, system control, content storage, and other functions. These computing devices include hardware (for example, servers, switches, network interface cards, storage adapters, storage devices and others) and software (for example, server applications, operating systems, firmware, management applications, application programming interface (APIs) and others).

Aircrafts today have individualized functional equipment dedicated to a passenger seat, which can be utilized by a passenger, such as adjustable seats, adjustable environmental controls, adjustable lighting, telephony systems, video and/or audio entertainment systems, crew communication systems, and the like. For example, many commercial airplanes have individualized video and audio entertainment systems, often referred to as “in-flight entertainment” or “IFE” systems.

It has become quite commonplace for travelers to carry personal electronic devices (PEDs) having wireless communication capability, such as cellular phones, smart phones, tablet computers, laptop computers, and other portable electronic devices. This includes passengers and crew traveling on all types of transportation including the vehicles of common carriers, such as airplanes, passenger trains, buses, cruise ships, sightseeing vehicles (e.g., ships, boats, buses, cars, etc.). Many of these personal electronic devices have the capability to execute application software programs (“apps”) to perform various functions, including controlling other devices and systems.

Seats of transportation vehicles may include power delivery components that provide power to electronic devices such as the PEDs. For example, a power deliver component in a seat may be used to plug in the PEDs to electrically power the PEDs or charge the PEDs. Continuous efforts are being made to develop approaches that improve implementations of such power delivery components.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

In one aspect, innovative technology is disclosed for performing voltage compensation for a power delivery component (e.g., for providing direct current (DC) power to an electronic device) at a passenger seat of a transportation vehicle, where a DC-to-DC voltage converter to convert an initial DC voltage to a seat box DC voltage and a voltage compensation component for such voltage compensation are included in a seat box coupled to the passenger seat, and the seat box is configured to provide a supply voltage to the power delivery component via an electrical cable connected to the power delivery component. When the seat box supplies the supply voltage at one end of the electrical cable, the power delivery component receives a power delivery component voltage at the other end of the electrical cable and measures the power delivery component voltage. Then, the seat box receives the power delivery component voltage measured at the power delivery component, determines a voltage drop across the electrical cable based at least on the measured power delivery component voltage, and controls the voltage compensation component to adjust a supply voltage provided to the electrical cable based on the voltage drop. As such, the voltage drop across the cable affecting the change from the supply voltage to the power delivery component voltage is considered for the voltage compensation.

As a preliminary note, the terms “component”, “module”, “system”, and the like as used herein are intended to refer to a computer-related entity, either software-executing general-purpose processor, hardware, firmware or a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

Figure 1A:
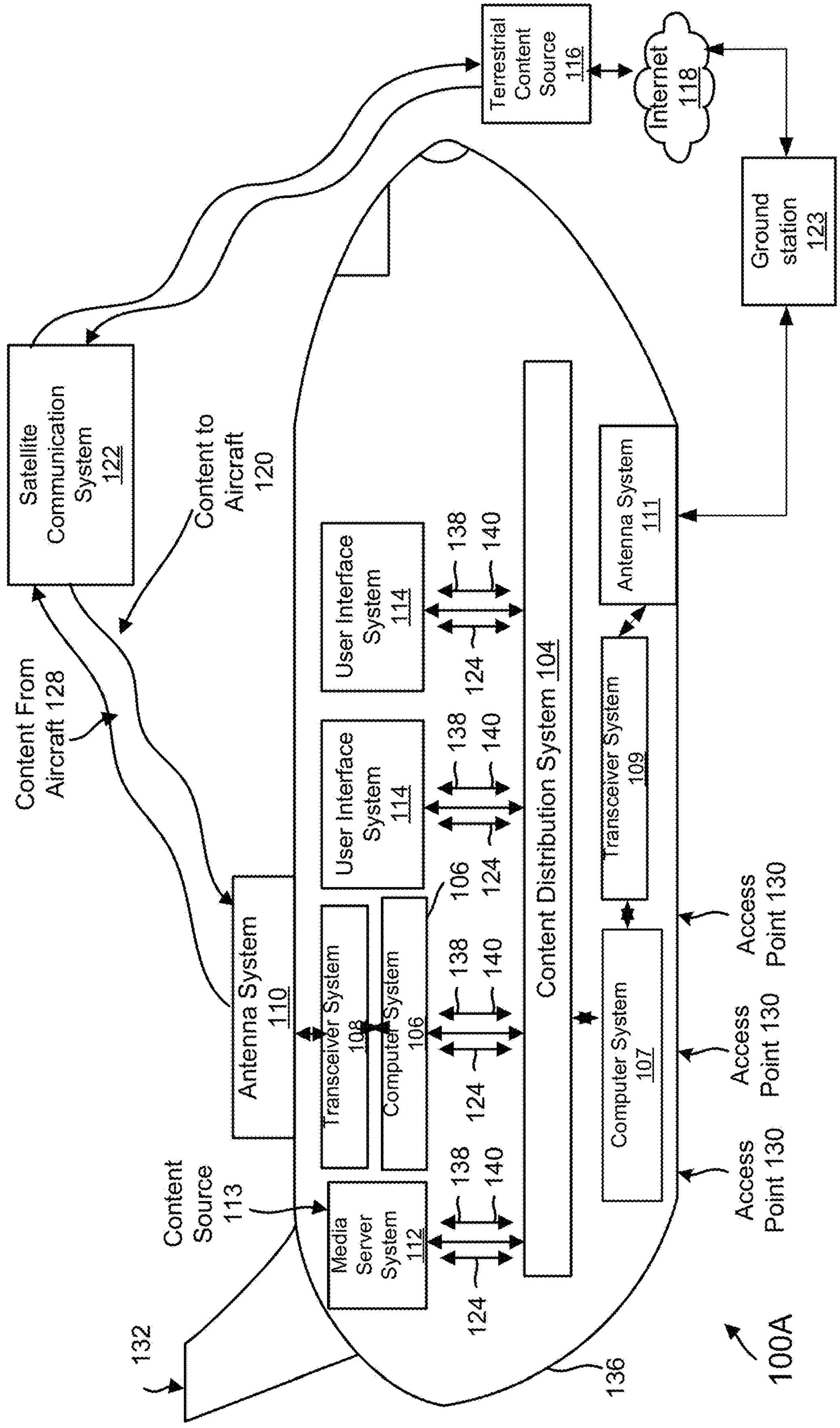
FIG. 1A shows an example of an operating environment for implementing the various aspects of the present disclosure on an aircraft.

Vehicle Information System: FIG. 1A shows an example of a generic vehicle information system 100A (also referred to as system 100A) that can be configured for installation aboard an aircraft 132, according to one aspect of the present disclosure. When installed on an aircraft, system 100A can comprise an aircraft passenger IFE system, such as the Series 2000, 3000, eFX, eX2, eXW, eX3, NEXT, and/or any other in-flight entertainment system developed and provided by Panasonic Avionics Corporation (without derogation of any trademark rights of Panasonic Avionics Corporation) of Lake Forest, California, the assignee of this application.

System 100A may include one or more content source 113 and one or more user (or passenger) interface systems (may also be referred to as a seat device/seatback device/IFE device 326 described below with respect to FIG. 3) 114 that communicate with a real-time content distribution system 104.

As an example, the content sources 113 may include one or more internal content sources, such as a media server system 112, that are installed aboard the aircraft 132, one or more remote (or terrestrial) content sources 116 that can be external from the aircraft 132, or a distributed content system. The media server system 112 can be provided as an information system controller for providing overall system control functions for system 100A and/or for storing viewing content 124, including pre-programmed viewing content and/or content 120 downloaded to the aircraft, as desired. The viewing content 124 can include television programming content, music content, podcast content, photograph album content, audiobook content, and/or movie content without limitation. The viewing content as shown and described herein is not exhaustive and are provided herein for purposes of illustration only and not for purposes of limitation.

The server system 112 can include, and/or communicate with, one or more conventional peripheral media storage systems (not shown), including optical media devices, such as a digital video disk (DVD) system or a compact disk (CD) system, and/or magnetic media systems, such as a solid state drive (SSD) system, or a hard disk drive (HDD) system, of any suitable kind, for storing preprogrammed content and/or downloaded content 120.

The viewing content 124 can comprise any conventional type of audio and/or video viewing content, such as stored (or time-delayed) viewing content and/or live (or real-time) viewing content. As desired, the viewing content 124 can include geographical information. Alternatively, and/or additionally, to entertainment content, such as live satellite television programming and/or live satellite radio programming and/or live wireless video/audio streaming, the viewing content likewise can include two-way communications, such as real-time access to the Internet 118 and/or telecommunications and/or a ground station 123 that communicates through an antenna 111 to a transceiver system 109, and a computer system 107 (similar to computer system 106). The functionality of computer system 107 is like computing system 106 for distributing content using the content distribution system 104 described herein. It is noteworthy that although two antenna systems 110/111 have been shown in FIG. 1A, the adaptive aspects disclosed herein may be implemented by fewer or more antenna systems.

Being configured to distribute and/or present the viewing content 124 provided by one or more selected content sources 113, system 100A can communicate with the content sources 113 in real time and in any conventional manner, including via wired and/or wireless communications. System 100A and the terrestrial content source 116, for example, can communicate directly and/or indirectly via an intermediate communication system, such as a satellite communication system 122 or the ground station 123.

System 100A can receive content 120 from a selected terrestrial content source 116 and/or transmit (upload) content 128, including navigation and other control instructions, to the terrestrial content source 116. In one aspect, content 120 includes media content that is stored persistently on the aircraft for passenger consumption. The media content for persistence storage is handled differently than live television content, as described below. As desired, terrestrial content source 116 can be configured to communicate with other terrestrial content sources (not shown). Terrestrial content source 116 is shown as providing access to the Internet 118. Although shown and described as comprising the satellite communication system 122 and the cellular base station 123 for purposes of illustration, the communication system can comprise any conventional type of wireless communication system, such as any wireless communication system and/or an Aircraft Ground Information System (AGIS) communication system.

To facilitate communications with the terrestrial content sources 116, system 100A may also include an antenna system 110 and a transceiver system 108 for receiving the viewing content from the remote (or terrestrial) content sources 116. The antenna system 110 preferably is disposed outside, such as an exterior surface of a fuselage 136 of the aircraft 132. The antenna system 110 can receive viewing content 124 from the terrestrial content source 116 and provide the received viewing content 124, as processed by the transceiver system (may also referred to as broadband controller) 108, to a computer system 106 of system 100A. The computer system 106 can provide the received viewing content 124 to the media (or content) server system 112 and/or directly to one or more of the user interfaces 114 including a PED, as desired. Although shown and described as being separate systems for purposes of illustration, the computer system 106 and the media server system 112 can be at least partially integrated.

The user interface system 114 may be computing terminals in communication with an access point 130. The user interface system 114 provides a display device to view content. The user interface system 114 includes a hardware interface to connect to an access point 130 that provides a wired and/or a wireless connection for the user interface system. In at least one embodiment, the user interface system 114 comprises a software application that a user downloads and installs on a PED to receive and view content via a wireless access point 130. While bandwidth limitation issues may occur in a wired system on a vehicle, such as an aircraft 132, in general the wired portion of the vehicle information 100A system is designed with enough bandwidth to support all users aboard the vehicle, i.e., passengers.

The user interface system 114 can include an input system (not shown) for permitting the user (or passenger) to communicate with system 100A, such as via an exchange of control signals 138. For example, the input system can permit the user to input one or more user instructions 140 for controlling the operation of system 100A. Illustrative user instructions 140 can include instructions for initiating communication with the content source 113, instructions for selecting viewing content 124 for presentation, and/or instructions for controlling the presentation of the selected viewing content 124. If a fee is required for accessing the viewing content 124 or for any other reason, payment information likewise can be entered via the input system. The input system can be provided in any conventional manner and typically includes a touch screen, application programming interface (API), one or more switches (or pushbuttons), such as a keyboard or a keypad, and/or a pointing device, such as a mouse, trackball, or stylus.

In one aspect, the user interface system 114 is provided on individual passenger seats of aircraft 132. The user interface system 114 can be adapted to different aircraft and seating arrangements and the adaptive aspects described herein are not limited to any specific seat arrangements or user interface types.

Figure 1B:
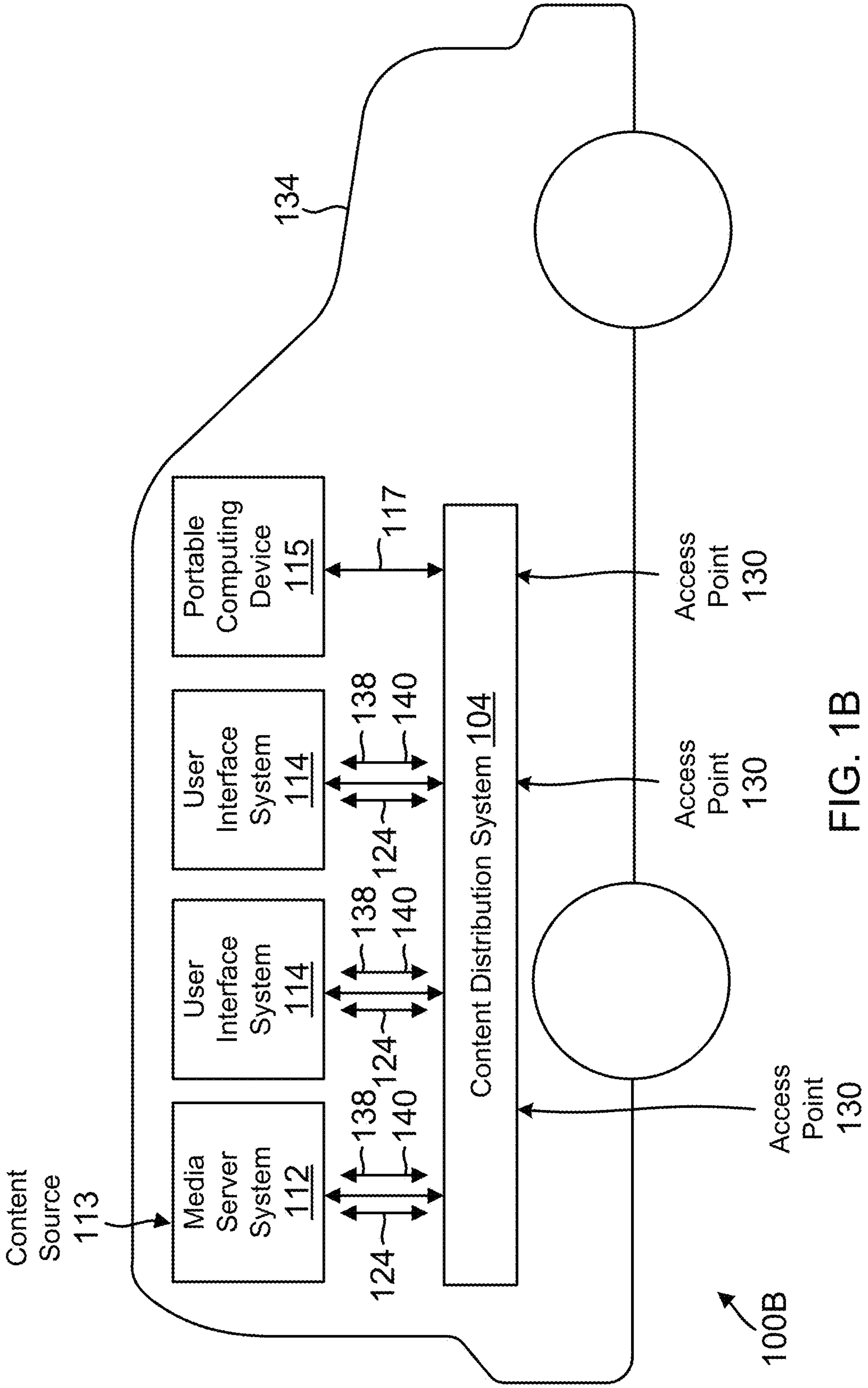
FIG. 1B shows an example of the operating environment on a non-aircraft transportation vehicle type, according to one aspect of the present disclosure.

FIG. 1B shows an example of implementing the vehicle information system 100B (may be referred to as system 100B) on an automobile 134 that may include a bus, a recreational vehicle, a boat, and/or a train, or any other type of passenger vehicle without limitation. The various components of system 100B may be like the components of system 100A described above with respect to FIG. 1A and for brevity are not described again.

Figure 2:
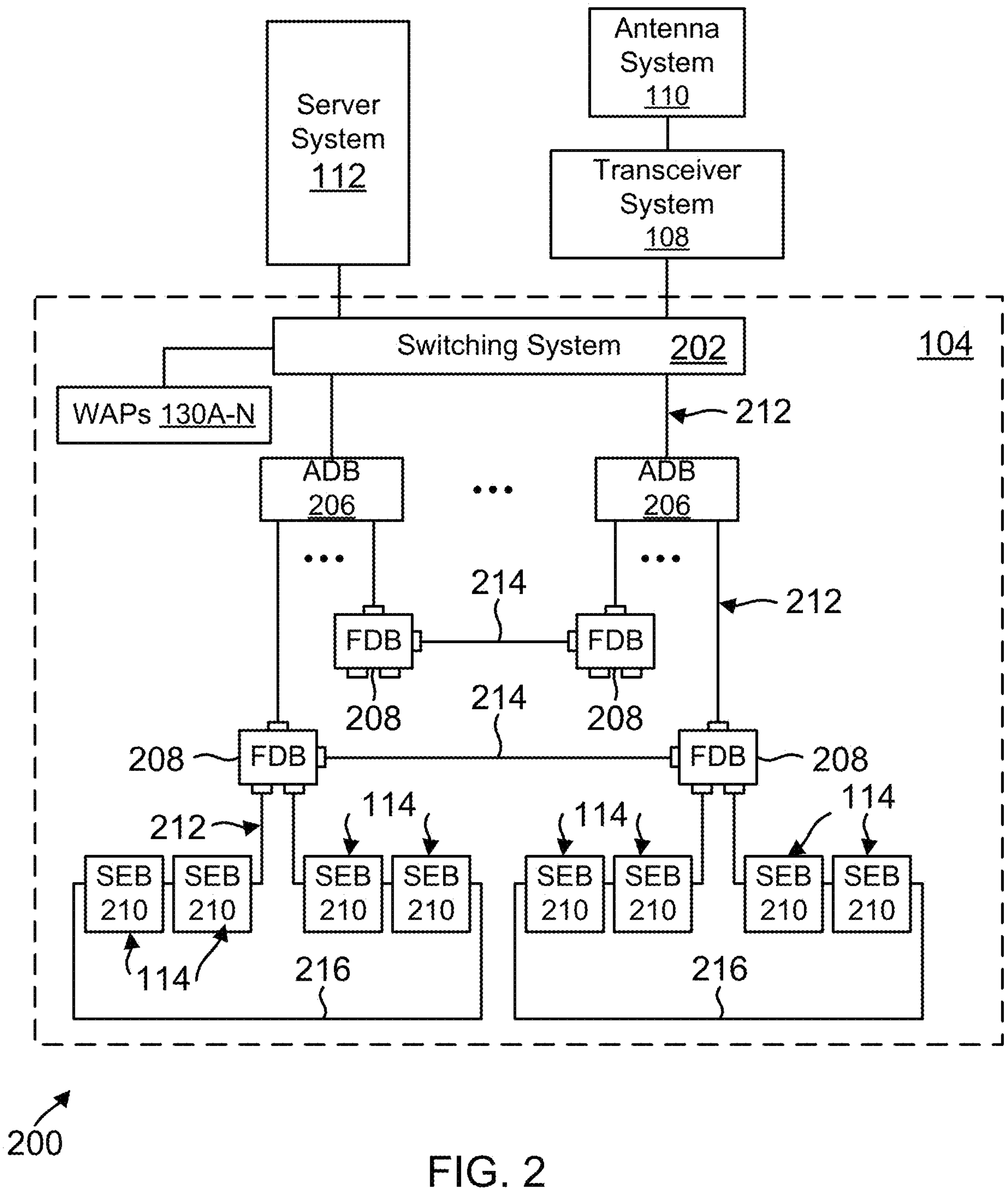
FIG. 2 shows an example of a content distribution system, used according to one aspect of the present disclosure.

Content Distribution System:

FIG. 2 illustrates an example of the content distribution system 104 for the vehicle information system 200 (similar to 100A/100B), according to one aspect of the present disclosure. The content distribution system 104 couples, and supports communication between the server system 112, and the plurality of user interface systems 114. The content distribution system 104, for example, can be provided as a conventional wired and/or wireless communication network, including a telephone network, a local area network (LAN), a wide area network (WAN), a campus area network (CAN), personal area network (PAN) and/or a wireless local area network (WLAN) of any kind. Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16.

Preferably being configured to support high data transfer rates, the content distribution system 104 may comprise a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps) or any other transfer rate. To achieve high data transfer rates in a wireless communications environment, free-space optics (or laser) technology, millimeter wave (or microwave) technology, and/or Ultra-Wideband (UWB) technology can be utilized to support communications among the various system resources, as desired.

As illustrated in FIG. 2, the distribution system 104 can be provided as a plurality of area distribution boxes (ADBs) 206, a plurality of floor disconnect boxes (FDBs) 208, and a plurality of seat electronics boxes (SEBs) (and/or video seat electronics boxes (VSEBs) and/or premium seat electronics boxes (PSEBs)) 210 being configured to communicate in real time via a plurality of wired and/or wireless communication connections 212.

The distribution system 104 likewise can include a switching system 202 for providing an interface between the distribution system 104 and the server system 112. The switching system 202 can comprise a conventional switching system, such as an Ethernet switching system, and is configured to couple the server system 112 with the ADBs 206. Each of the ADBs 206 is coupled with, and communicates with, the switching system 202. In addition, the distribution system 104 includes one or more wireless access points (WAPs) (130A to 130N) connected in communication with the switch system 202 for wireless distribution of content to user interface systems 114 including PEDs.

Each of the ADBs 202, in turn, is coupled with, and communicates with, at least one FDB 208. Although the ADBs 206 and the associated FDBs 208 can be coupled in any conventional configuration, the associated FDBs 208 preferably are disposed in a star network topology about a central ADB 206 as illustrated in FIG. 2. Each FDB 208 is coupled with, and services, a plurality of daisy-chains of SEBs 210. The SEBs 210, in turn, are configured to communicate with the user interface systems 114. Each SEB 210 can support one or more of the user interface systems 114.

The switching systems 202, the ADBs 206, the FDBs 208, the SEBs (and/or VSEBs), and/or PSEBs) 210, the antenna system 110 (or 111), the transceiver system 108, the content source 113, the server system 112, and other system resources of the vehicle information system preferably are provided as line replaceable units (LRUs). The use of LRUs facilitate maintenance of the vehicle information system 200 because a defective LRU can simply be removed from the vehicle information system 200 and replaced with a new (or different) LRU. The defective LRU thereafter can be repaired for subsequent installation. Advantageously, the use of LRUs can promote flexibility in configuring the content distribution system 104 by permitting ready modification of the number, arrangement, and/or configuration of the system resources of the content distribution system 104. The content distribution system 104 likewise can be readily upgraded by replacing any obsolete LRUs with new LRUs.

Distribution system 104 can include at least one FDB internal port bypass connection 214 and/or at least one SEB loopback connection 216. Each FDB internal port bypass connection 214 is a communication connection 212 that permits FDBs 208 associated with different ADBs 206 to directly communicate. Each SEB loopback connection 216 is a communication connection 212 that directly couples the last SEB 210 in each daisy-chain of seat electronics boxes 210 for a selected FDB 208 as shown in FIG. 2. Each SEB loopback connection 216 therefore forms a loopback path among the daisy-chained seat electronics boxes 210 coupled with the relevant FDB 208.

It is noteworthy that the various aspects of the present disclosure may be implemented without using FDB 208. When FDB 208 is not used, ADB 206 communicates directly with SEB 210 and/or server system 112 may communicate directly with SEB 210 or the seats. The various aspects of the present disclosure are not limited to any specific network configuration.

Figure 3A:
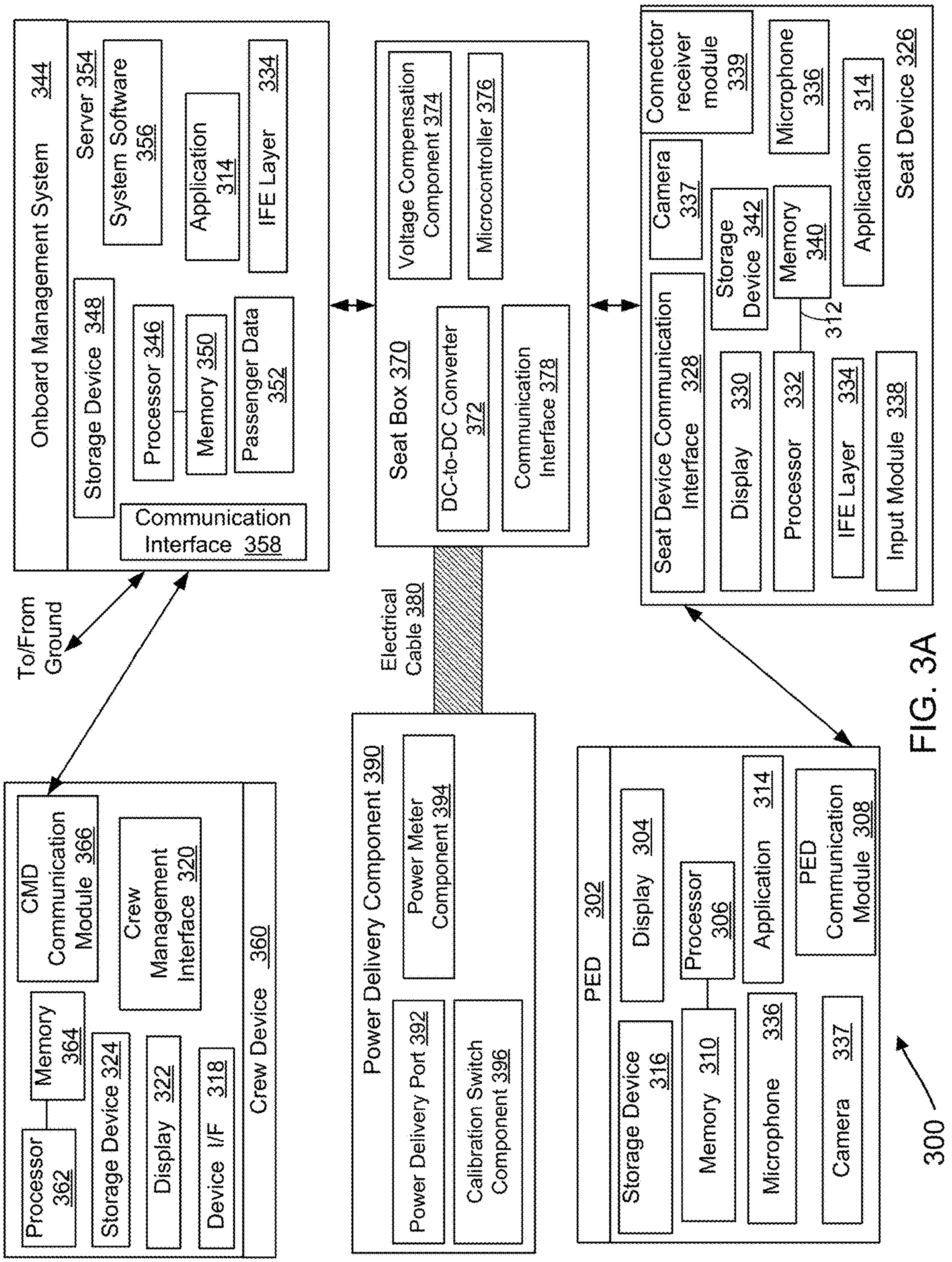
FIG. 3A shows an example of a system for performing voltage compensation for a power delivery component at a passenger seat in a transportation vehicle, according to one aspect of the present disclosure.

System 300:

FIG. 3A shows an example of a system 300 configured to operate within an aircraft system (e.g., an onboard management system 344 executing an IFE layer, may also be referred to as the IFE system), according to one aspect of the present disclosure. In one aspect, system 300 includes the onboard management system 344 with a server 354, a seat device 326, a PED 302, when authorized, and a crew device (may be referred to as "CMD") 360, when authorized. Further, system 300 includes a seat box 370 (e.g., SEB 219) and a power delivery component 390 connected to the seat box 370 to receive electrical power via an electrical cable 380 from the seat box 370. In yet another aspect, system 300 includes the CMD 360 and the PED 302 or the CMD 360 and the seat device 326, respectively.

In one aspect, the onboard management system 344 includes server 354 (similar to the media server 112 and/or computer system 106/107 described above with respect to FIGS. 1A/1B). The server 354 includes a processor 346 that has access to a memory 350 via a bus system/interconnect (similar to 312 on seat device 326). The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 346 may be, or may include, one or more programmable, hardware-based, general-purpose or special-purpose microprocessors, digital signal processors (DSPs), programmable controllers, application specific integrated circuits (ASICs), programmable logic devices (PLDs), or the like, or a combination of such devices.

Processor 346 has access to a storage device 348 that may be used to store data, applications and program files, including system software 356, application 314, and others.

In one aspect, system software 356 is executed by processor 346 to control the overall operation of the server 354. Application 314 may be downloaded from server 354 by passengers using an authorized PED 302 paired with the seat device 326 and/or server 354 for accessing digital content.

In one aspect, the onboard management system 344 maintains flight and passenger data 352 (may also be referred to as data 352), for example, flight itinerary including origin location, layover locations, destination location, arrival time and other information. Data 352 may also include passenger data that identifies each passenger for a flight, a seat assigned to a passenger, a language preference for the passenger, and any other information that can uniquely identify the passengers. Data 352 may be retrieved from a ground system before flight departure.

In one aspect, server 354 communicates with CMD 360, PED 302 and/or seat device 326 via the communication interface 358. The communication interface 358 may also be used to receive information from the ground, for example, data 352 and other information. The communication interface 358 includes one or more interfaces for a wired and/or wireless connection, as described above with respect to FIGS. 1A/1B and 2. In one aspect, the server 354 communicates with seat device 326 via a seat box 370, which is described in more detail below.

In one aspect seat device 326 includes a display device 330, a processor 332, a memory 340, a seat device communication interface (also referred to as communication interface) 328 and a local storage device 342 for storing content. The seat device may optionally include a camera 337 and a microphone 336. The camera may be used to take pictures and videos and the microphone may be used for receiving voice input.

In one aspect, the seat device 326 receives user input/requests via an input module 338. The input module 338 may be configured to use a local touch screen included with display 330, a local virtual keyboard, an external mouse, external keyboard or any other input device.

In one aspect, processor 332 has access to memory 340 via an interconnect 312. Processor 332 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The bus system 312 is an abstraction that represents any one or more separate physical buses and/or point-to-point connections, connected by appropriate bridges, adapters and/or controllers. The bus system 312, therefore, may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

In one aspect, processor 332 executes an IFE layer 334 out of memory 340. The IFE layer 334 provides in-flight entertainment and other options for users. The IFE layer 334 provides audio/video content as well as controls for accessing the content.

In one aspect, the IFE layer 334 uses the seat device communication interface 328 to interface with the PED 302 and/or onboard management system 344. The communication interface 328 includes logic and circuitry for interfacing with the onboard management system 344 and/or PED 302. In one aspect, the communication interface 328 may use a wireless and/or wired connection for such communication.

In another aspect, the seat device 326 may also execute the application 314 that may be used by the passenger to view media content or various computing functions that are enabled by the seat device 326. Application 314 when executed by the seat device 326 may have different functionality compared to when application 314 is executed by the PED 302.

The seat device 326 on the aircraft may be part of the user interface system 114 or interfaces with the user interface system 114 also described above with respect to FIGS. 1A/1B. It is noteworthy that seat device 326 need not be mounted on the back of a seat and may be supported from other structures, such as a bulkhead, wall, arm of a seat, etc. The adaptive aspects of the present disclosure are not limited to any specific location or orientation of the seat device 326.

In one aspect, server 354 communicates with the CMD 360 that may be a mobile phone, a notebook, a tablet, a laptop or any other similar device. CMD 360 may include a processor 362 that has access to a memory 364 via a bus system/interconnect (similar to 312) for executing stored instructions. The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 362 may be, or may include, one or more programmable, hardware based, general-purpose or special-purpose microprocessors, digital signal processors (DSPs), programmable controllers, application specific integrated circuits (ASICs), programmable logic devices (PLDs), or the like, or a combination of such hardware devices.

In one aspect, CMD 360 includes a display 322 to display information. Display 322 may also include a touch screen for receiving input commands. CMD 360 typically includes a microphone (not shown) for receiving voice input. CMD 360 may also include a camera (not shown) for taking pictures or making a video. The CMD 360 may also include a storage device 324 that may include any storage medium for storing data in a non-volatile manner, such as one or more magnetic or optical based disks, flash memory, or solid-state drive. The storage device 316 may be used to store a device interface 318, may also be referred to as a "crew management interface (CMI)" 318 that may be executed out of memory 364.

The CMI 318 enables the CMD 360 to interface with the onboard management system 344 via a CMD communication module 366. The CMD 360 may present one or more APIs to the onboard management system 344 to retrieve passenger/flight data and update data structure 352. The non-limiting API format and syntax will depend on the protocols used by the CMD 360 and the onboard management system 344.

In one aspect, the CMD communication module 366 is also used to communicate with the seat device 326, when installed, and one or more PEDs 302. CMI 320 receives information regarding one or more seat attributes that do not meet take-off and/or landing conditions. CMI 320 notifies the seat device and/or paired PED 302 if a passenger needs to take action (e.g., move the passenger seat, tray table, window or any other action.

In one aspect, the CMD communication module 366 may include one or more interfaces to communicate with different devices, including Wi-Fi interface, Bluetooth interface, NFC (Near Field Communication) interface and others. The adaptive aspects described herein are not limited to any specific interface. It is noteworthy that although a single block is shown for the CMD communication module 366 for convenience, the communication module may have different interface, cards, logic and circuitry to comply with the different communication protocols/standards.

In one aspect, the PED 302 is securely paired with the seat device 326. The term "pair" means that PED 302 is associated and authenticated by the seat device 326 and/or server 354 to send and receive information.

As an example, the PED 302 may be a mobile phone, a notebook, a tablet, a laptop or any other computing device. PED 302 may include a processor 306 that has access to a memory 310 via a bus system/interconnect (similar to 312 on the seat device 326) for executing stored instructions. The bus system may represent any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 306 may be, or may include, one or more programmable, hardware based, general-purpose or special-purpose microprocessors, digital signal processors (DSPs), programmable controllers, application specific integrated circuits (ASICs), programmable logic devices (PLDs), or the like, or a combination of such hardware devices.

PEDs 302 may also include a microphone 336 for receiving voice input from a passenger. The voice input can be converted into text by application 314 for processing. In another aspect, PED 302 also includes a camera 337 that may be used by a passenger to upload a video.

PED 302 includes a storage device 316 that may be or may include any storage medium for storing data in a non-volatile manner, such as one or more magnetic or optical based disks, flash memory, or solid-state drive. The storage device 316 may be used to store content displayed on display 304 of PED 302 when used by a passenger. In one aspect, display 304 may include a touch screen for receiving input commands.

The storage device 316 may also store the application 314 that is executed out of memory 310. Application 314 may be used to pair the PED 302 with the aircraft systems to receive content from device 115, as well as to communicate with CMD 360.

As an example, application 314 may be made available for download and installation via a public repository such as that maintained respectively under the trademark GOOGLE PLAY by Google, Inc. and/or the APP STORE maintained by Apple Inc. (without derogation to any third party trademark rights). In addition, application 314 may be provided for download by an airline carrier on a website or from the onboard management system 344.

In one aspect, PED 302 uses a PED communication module 308 to communicate with the seat device 326 and/or CMD 360, when installed. In one aspect, PED communication module 308 may include one or more interfaces to communicate with different devices, including Wi-Fi interface, Bluetooth interface, NFC (Near Field Communication) interface and others. The adaptive aspects described herein are not limited to any specific interface. It is noteworthy that although a single block is shown for the PED communication module 308 for convenience, the communication module may have different interface, cards, logic and circuitry to comply with the different communication protocols/standards.

In one aspect, the seat box 370 may be implemented for particular seat(s). For example, the seat box 370 may be an embodiment of the SEB 210 of FIG. 2. The seat box 370 includes a DC-to-DC converter 372, a voltage compensation component 374, and a microcontroller 376. The DC-to-DC converter 372 may be configured to convert from one voltage to another voltage. The voltage compensation component 374 may be configured to adjust a voltage output to another device such as the power delivery component 390. The microcontroller 376 may be configured to control the voltage compensation component 374. For example, the microcontroller 376 may include a processor to perform various operations. Additional details about the seat box 370 are explained in more detail below.

In one aspect, the power deliver component 390 includes a power delivery port 392 and a power meter component 394. The power delivery port 392 is used to deliver power to an electronic device such as the PED 302 to power the electronic device or charge its battery. The power delivery port 392 may be used to deliver DC power and thus may be referred to as a DC power delivery port. The seat box 370 is connected to the power delivery component 390 via the electrical cable 380 and provides a supply voltage to the electrical cable 380. The power meter component 394 is configured to measure a power delivery component voltage supplied to the power delivery component 390 via the electrical cable 380. Additional details about the power delivery component 390 are explained in more detail below.

In one aspect, the seat box 370 may further include a communication interface 378. For example, the seat box 370 may communicate data with other devices such as the server 354 and the seat device 326 using the communication interface 378.

Seats of a transportation vehicle such as an aircraft may implement power delivery components configured to provide power to electronic devices such as the PEDs. For example, a power delivery component may include an power outlet or a power port (e.g., USB port) to plug in an electronic device to power and/or charge the electronic device. Voltages provided to the electronic devices via the power delivery component at a seat of a transportation vehicle may not always stay at a steady level but may fluctuate. Thus, voltage compensation may be implemented to compensate for such voltage fluctuations. Generally, a voltage compensation component for the voltage compensation is implemented locally at the power delivery component for a seat of a transportation vehicle. However, it may be difficult to keep the power delivery component small when the voltage compensation component is implemented at the power delivery component. Further, a DC-to-DC converter configured to convert an initial DC voltage to a DC voltage to be supplied to the electronic devices is often included in the power delivery component, which makes reducing the size of the power delivery component difficult. Reducing a size of the power delivery component may be beneficial especially for a seat of a transportation vehicle at least because a small power delivery component will not take up much space at the seat that has a limited space.

Moving the DC-to-DC converter into the seat box may allow the power delivery component to be much smaller and cooler. However, if the DC-to-DC converter is moved to the seat box and an electrical cable is used to supply a DC voltage from the DC-to-DC converter from the seat box to the power delivery component, the DC voltage supplied from the DC-to-DC converter may drop significantly along the electrical cable, e.g., due to a high power delivery current and/or a resistance of the electrical cable. Due to the voltage drop, the power delivery component voltage that is the actual voltage supplied to the power delivery component is often significantly lower than the DC voltage supplied from the DC-to-DC converter. Additionally, a length of the electrical cable connecting the seat box and the power delivery component may vary, depending on positions of the seat box and the power delivery component. may vary for seat boxes, for example. For example, if a seat box is connected to multiple power delivery components at various locations, lengths of cables connecting the seat box respectively to the multiple power delivery components may be different from each other. An electrical resistance of the electrical cable varies depending on a length of the electrical cable, and thus the voltage drop across the electrical cable varies depending on the length of the electrical cable. For example, a longer electrical cable may have a higher resistance than a shorter electrical cable. Further, the electrical resistance of the electrical cable may also vary depending on a thickness of the electrical cable, where a thicker electrical cable may have a lower resistance than a thinner electrical cable. At least for these reasons, a voltage drop across the electrical cable between the seat box and the power delivery component needs to be considered in voltage compensation for the voltage supplied from the seat box to the power delivery component, such that a desired voltage may be supplied to the power delivery component.

According to some aspects of the disclosure, a seat box (e.g., seat box 370) of a passenger seat in a transportation vehicle employs a DC-to-DC converter to convert an initial DC voltage provided to the seat box to a seat box DC voltage, and further employs a voltage compensation component to change the seat box DC voltage from the DC-to-DC converter to produce the supply voltage provided to a power delivery component (e.g., power delivery component 390) of the passenger seat via an electrical cable (e.g., electrical cable 380), where a processor of the seat box controls the voltage compensation component based on a voltage drop across the electrical cable connected to the power delivery component. A power meter component of the power delivery component measures a power delivery component voltage received at the power delivery component 390 via the electrical cable, and provides the measured power delivery component voltage to the processor of the seat box. When the processor of the seat box receives the measured power delivery component voltage from the power meter component of the power delivery component, the processor determines a voltage drop across the electrical cable based at least on the power delivery component voltage, and controls the voltage compensation component based on the voltage drop to adjust the supply voltage based on the voltage drop. For example, based on the voltage drop, the processor of the seat box may determine how much to adjust the supply voltage to reach a desired voltage level at the power delivery component at the other end of the electrical cable.

Hence, the supply voltage provided to the electrical cable may be dynamically adjusted by the voltage compensation component based on the voltage drop that is updated constantly according to the measurement of the power delivery component voltage. Further, as discussed above, a length of the electrical cable connecting the seat box and the power delivery component may vary, which may affect the voltage drop. By controlling the voltage compensation component to adjust the supply voltage, the variation of the cable length affecting the voltage drop may be considered.

Figure 3B:
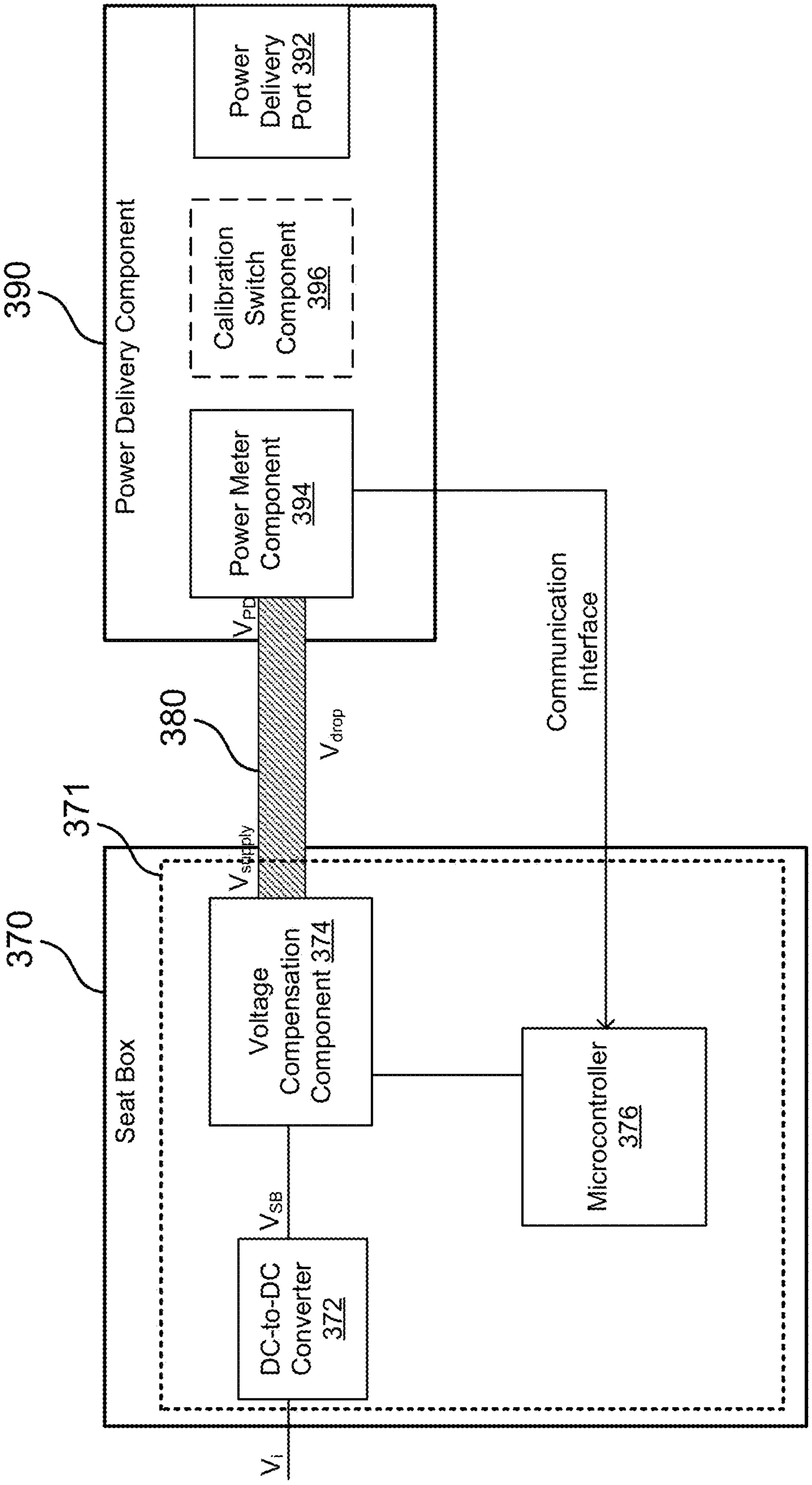
FIG. 3B shows an example of a power delivery component and a seat box configured to perform voltage compensation for the power delivery component at a passenger seat in a transportation vehicle, according to some aspects

System for Voltage Compensation:

FIG. 3B shows an example of a power delivery component and a seat box configured to perform voltage compensation for the power delivery component at a passenger seat in a transportation vehicle, according to some aspects. As shown in FIG. 3B, the seat box 370 includes the DC-to-DC converter 372, the voltage compensation component 374, and the microcontroller 376, while the power delivery component 390 includes the power delivery port 392 and the power meter component 394. The seat box 370 is connected to the power delivery component 390 via the electrical cable 380 to provide a supply voltage $V_{supply}$ to the power delivery component 390 via the electrical cable 380. In an aspect, the seat box 370 may include a seat box component 371 coupled to a passenger seat of the transportation vehicle, and the DC-to-DC converter 372, the voltage compensation component 374, and the microcontroller 376 may be included in the seat box component 371.

The power delivery component 390 is coupled to a passenger seat of a transportation vehicle such as an aircraft. For example, the power delivery component 390 may be attached to a side of the passenger seat, an armrest of the passenger seat, and/or the seat device 326 of the passenger seat. In one example, the power delivery component 390 may be either a part of the seat device 326 or a separate component from the seat device 326. The power delivery port 392 of the power delivery component 390 is used to provide electrical power to an electronic device such as the PED 302. In one aspect, the power delivery port 392 may be a DC power port capable of providing DC power. For example, the power delivery port 392 may be a USB port where a passenger may plug a USB cable into the power delivery port 392, such that the user's electronic device connected to the USB cable may be powered by the DC power provided by the power delivery port 392.

The power meter component 394 of the power delivery component 390 is configured to measure a power delivery component voltage $V_{PD}$ received at the power delivery component 390 via the electrical cable 380. The supply voltage $V_{supply}$ provided by the seat box 370 at a first end of the electrical cable 380 (e.g., at or near the voltage compensation component 374) and the power delivery component voltage $V_{PD}$ received at the power delivery component 390 at a second end of the electrical cable 380 (e.g., at or near the power meter component 394) may be different due to a voltage drop $V_{drop}$ across the electrical cable 380. Therefore, the power delivery component voltage $V_{PD}$ measured by the power meter component 394 may be provided to the microcontroller 376 of the seat box 370, such that the microcontroller 376 may control the voltage compensation component 374 accordingly to account for the voltage drop $V_{drop}$.

The DC-to-DC converter 372 of the seat box 370 receives an initial DC voltage $V_i$ from a power source and converts the initial DC voltage $V_i$ to a seat box DC voltage $V_{SB}$ for the seat box 370. It may not be desirable to provide the seat box DC voltage $V_{SB}$ to the electrical cable 380 without any voltage compensation to account for the voltage drop $V_{drop}$ across the electrical cable 380. Hence, the voltage compensation component 374 is implemented to change the seat box DC voltage $V_{SB}$ to produce the supply voltage $V_{supply}$ provided to the power delivery component 390.

The microcontroller 376 is configured to receive the measured power delivery component voltage $V_{PD}$ from the power meter component 394 and determine a voltage drop $V_{drop}$ across the electrical cable 380 between the seat box 370 and the power delivery component 380 based at least on the measured power delivery component voltage $V_{PD}$. For example, the microcontroller 376 may determine the voltage drop $V_{drop}$ by calculating a difference between the supply voltage $V_{supply}$ provided by the seat box 370 at one end of the electrical cable 380 (e.g., the end connected to the voltage compensation component 374) and a power delivery component voltage $V_{PD}$ delivered to the power delivery component 390 at the other end of the electrical cable 380 (e.g., the end connected to the power meter component 394). Subsequently, based on the voltage drop $V_{drop}$, the microcontroller 376 controls the voltage compensation component 374 to adjust the supply voltage $V_{supply}$ based on the voltage drop $V_{drop}$. For example, to compensate for the reduction of voltage due to the voltage drop $V_{drop}$, the microcontroller 376 may control the voltage compensation component 374 to increase the supply voltage $V_{supply}$ based on the voltage drop $V_{drop}$.

In one aspect, the voltage compensation component 374 may include a variable resistor and a voltage compensation circuit for adjusting the seat box DC voltage $V_{SB}$ to produce the supply voltage $V_{supply}$ based on a resistance of the variable resistor. The microcontroller 376 may control the voltage compensation component 374 by adjusting the resistance of the variable resistor based on the voltage drop $V_{drop}$ across the electrical cable 380 to adjust the supply voltage $V_{supply}$. For example, the microcontroller 376 may control the voltage compensation component 374 based on the voltage drop $V_{drop}$ by transmitting a control signal to the voltage compensation component 374 to adjust the resistance of the variable resistor based on the voltage drop $V_{drop}$.

In one aspect, the power delivery component 390 may further include the calibration switch component 396 configured to draw a current through the electrical cable 380 into the power delivery component 390 when the calibration switch component 396 is activated during an initial calibration, where the calibration switch component 396 may be deactivated after the initial calibration. The current through the electrical cable 380 may not be sufficiently drawn into the power delivery component 390 if the power delivery port 370 is not connected to an electronic device. Hence, before the power delivery port 370 is used, during the initial calibration, the calibration switch component 396 may be activated to draw the current through the electrical cable 380 into the power delivery component 390. During the initial calibration, with the current drawn through the electrical cable 380, the power meter component 394 may measure the power delivery component voltage $V_{PD}$ that may be used by the microcontroller 376 to determine the voltage drop $V_{drop}$ and to control the voltage compensation component 374 based on the voltage drop $V_{drop}$ across the electrical cable 380.

In one aspect, the power delivery component voltage $V_{PD}$ measured by the power meter component 394 may be communicated to the microcontroller 376 via a communication interface, such as a serial bus, connecting the microcontroller 376 and the power meter component 394. The communication interface between the seat box 370 and power delivery component 390 may include an automotive audio bus (A2B). This allows the power delivery component voltage $V_{PD}$ measured by the power meter component 394 to be translated over the A2B to the microcontroller 376 of the seat box 370.

In one aspect, the calibration switch component 396 may include a calibration switch and a calibration resistor connected to the calibration switch. The calibration switch is configured to draw the current through the electrical cable 380 to the calibration resistor when the calibration switch is activated during the initial calibration. The calibration switch component 396 may be connected in parallel to the power meter component 394.

If there is too much voltage drop $V_{drop}$ (e.g., greater than a certain threshold) across the electrical cable 380, then there may be something wrong with the cable, and/or components of the seat box 370, and/or components of the power delivery component 390. For example, if the electrical cable 380 is damaged, a very large voltage drop $V_{drop}$ may be measured across the electrical cable 380. Hence, in one aspect, the microcontroller 376 may determine whether the voltage drop $V_{drop}$ exceeds a voltage drop threshold. If the voltage drop $V_{drop}$ exceeds the voltage drop threshold, the microcontroller 376 may generate a warning signal. The warning signal may be sent to a device monitored by an operator, such as the server 354 and/or the crew device 360, to alert a personnel in charge of maintenance of the seat box 370 and/or the power delivery component 390. If the voltage drop $V_{drop}$ does not exceed the voltage drop threshold, the warning signal is not generated.

Figure 3C:
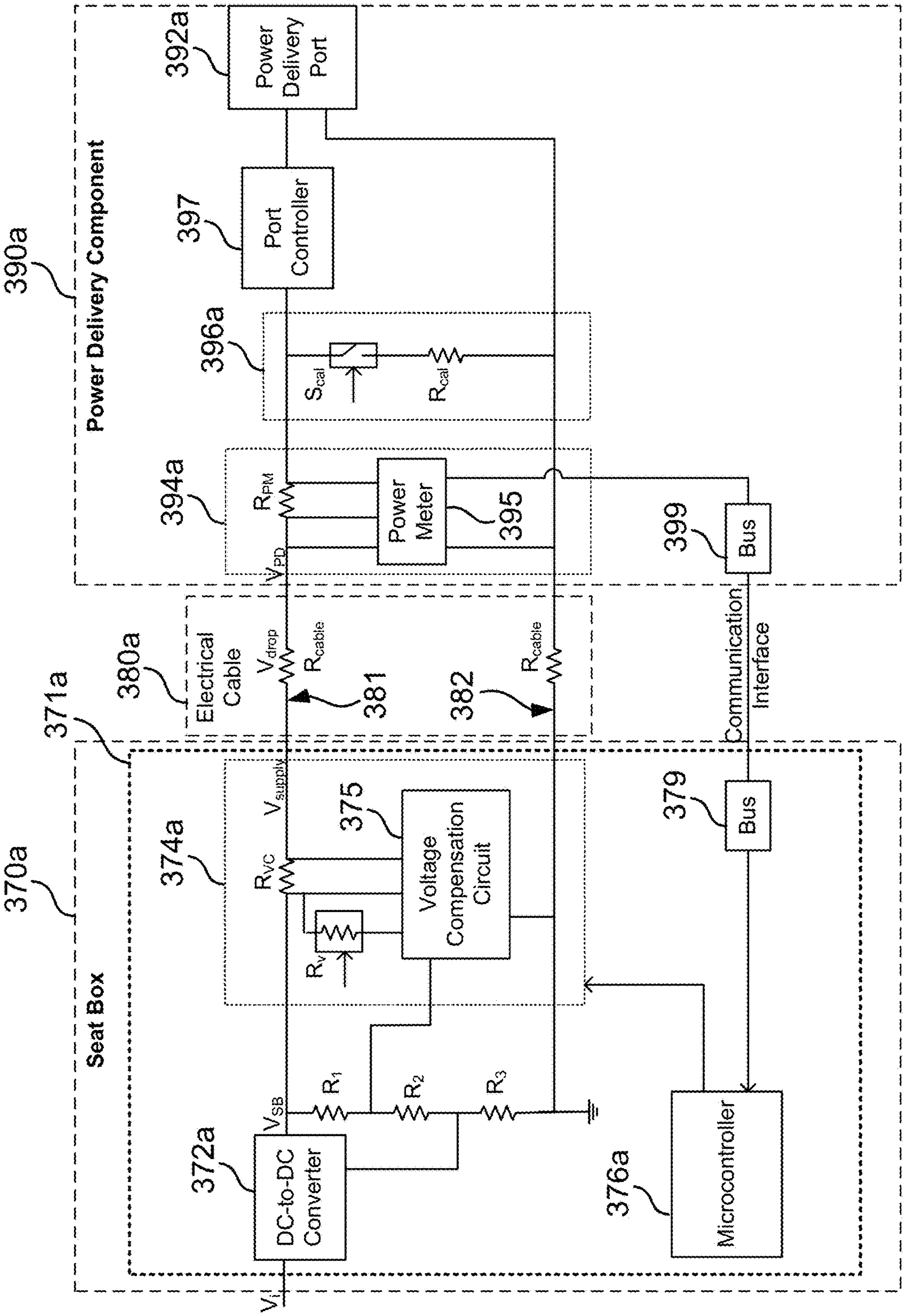
FIG. 3C shows an example circuit diagram of a power delivery component and a seat box configured to perform voltage compensation for the power delivery component at a passenger seat in a transportation vehicle, according to some aspects

Example Circuit for Voltage Compensation:

FIG. 3C shows an example circuit diagram of a power delivery component and a seat box configured to perform voltage compensation for the power delivery component at a passenger seat in a transportation vehicle, according to some aspects. The example shown in FIG. 3C may be perceived as an example of the components shown in FIG. 3B. In particular, FIG. 3C shows an example circuit diagram of a seat box 370*a*, an electrical cable 380*a*, and a power delivery component 390*a*. The seat box 370*a*, the electrical cable 380*a*, and the power delivery component 390*a* are examples of the seat box 370, the electrical cable 380, and the power delivery component 390 of FIG. 3B, respectively. The seat box 370*a* includes a DC-to-DC converter 372*a*, a voltage compensation component 374*a*, and a microcontroller 376*a*, while the power delivery component 390*a* includes a power delivery port 392*a*, a power meter component 394*a*, and a calibration switch component 396*a*. The DC-to-DC converter 372*a*, the voltage compensation component 374*a*, and the microcontroller 376*a* are examples of the DC-to-DC converter 372, the voltage compensation component 374, and the microcontroller 376 of FIG. 3B, respectively. The power delivery port 392*a*, the power meter component 394*a*, and the calibration switch component 396*a* are examples of the power delivery port 392, the power meter component 394, and the calibration switch component 396 of FIG. 3B, respectively. In an aspect, the seat box 370*a* may include a seat box component 371*a* coupled to a passenger seat of the transportation vehicle, and various components of the seat box 370*a* such as the DC-to-DC converter 372*a*, the voltage compensation component 374*a*, and the microcontroller 376*a* may be included in the seat box component 371*a*.

The DC-to-DC converter 372 of the seat box 370 is configured to receive an initial DC voltage $V_i$ from a power source and convert the initial DC voltage $V_i$ to a seat box DC voltage $V_{SB}$. The DC-to-DC converter 372 outputs the seat box DC voltage $V_{SB}$ at an output node of the DC-to-DC converter 372, which is connected to a first resistor $R_1$, a second resistor $R_2$, and a third resistor $R_3$ in series, where a node between the second resistor $R_2$, and the third resistor $R_3$ is connected to the DC-to-DC converter 372 and one end of the third resistor $R_3$ is connected to a ground.

The voltage compensation component 374 is configured to change the seat box DC voltage $V_{SB}$ to produce the supply voltage $V_{supply}$ provided to the power delivery component 390. The output node of DC-to-DC converter 372*a* outputting the seat box DC voltage $V_{SB}$ is connected to the voltage compensation component 374*a*. In particular, this output node of DC-to-DC converter 372*a* is connected to a voltage compensation component resistor $R_{VC}$ that is connected to a variable resistor $R_V$ and the voltage compensation circuit 375. The voltage compensation circuit 375 is configured to produce supply voltage $V_{supply}$ based on the seat box DC voltage $V_{SB}$ as well as voltage compensation component resistor $R_V$ and the variable resistor $R_V$. In particular, the resistance of the variable resistor $R_V$ can be adjusted (e.g., by the microcontroller 376*a*) to adjust the supply voltage $V_{supply}$. The voltage compensation circuit 375 is also connected to the ground.

The seat box 370*a* is connected to the power delivery component 390*a* via the electrical cable 380*a*. The power delivery component 390*a* includes the power meter component 394*a* configured to measure a power delivery component voltage $V_{PD}$ received at the power delivery component 390 via the electrical cable 380*a*, and the power delivery port 392 configured to provide electrical power to an electronic device such as the PED 302. A port controller 397 may exist between the power meter component 394*a* and the power delivery port 392*a* to control the power provided to the power delivery port 392*a*.

As shown in FIG. 3C, the electrical cable 380*a* may include a first cable line 381 connected to the voltage compensation component resistor $R_{VC}$ and carrying the supply voltage $V_{supply}$ and may further include a second cable line 382 connected to the ground and the voltage compensation circuit 375. The first cable line 381 may have a cable resistance $R_{cable}$ and the second cable line 382 may also have the cable resistance $R_{cable}$. Due to the cable resistance $R_{cable}$, there is a voltage drop $V_{drop}$ across the electrical cable 380*a*, which causes reduction of the voltage from the supply voltage $V_{supply}$ at a first end of the electrical cable 380*a* to a power delivery component voltage $V_{PD}$ at a second end of the electrical cable 380*a*. The power delivery component voltage $V_{PD}$ is measured by a power meter 395 of the power meter component 394, which provides the measured power delivery component voltage $V_{PD}$ to the microcontroller 376 of the seat box 370, such that the microcontroller 376 may control the voltage compensation component 374 accordingly to account for the voltage drop $V_{drop}$. The power meter 395 is connected to the first cable line 381 and a power meter resistor RPM at one end and is connected to the second cable line 382. The power meter 395 is also connected to a communication interface to communicate the measured power delivery component voltage $V_{PD}$ to the microcontroller 376. In particular, the power meter 395 may be connected to a first serial bus 399 in the power delivery component 390 that is connected to the second serial bus 379 in the seat box 370*a*, where the second serial bus 379 is connected to the microcontroller 376. The first serial bus 399 may be an A2B and/or the second serial bus 379 may be an A2B.

After receiving the measured power delivery component voltage $V_{PD}$ via the communication interface, the microcontroller 376*a* determines a voltage drop $V_{drop}$ across the electrical cable 380*a* based at least on the measured power delivery component voltage $V_{PD}$. For example, as discussed above, the microcontroller 376*a* may determine the voltage drop $V_{drop}$ by calculating a difference between the supply voltage $V_{supply}$ and the power delivery component voltage $V_{PD}$. After determining the voltage drop $V_{drop}$, the microcontroller 376*a* controls the voltage compensation component 374 to adjust the supply voltage $V_{supply}$ based on the voltage drop $V_{drop}$, e.g., by transmitting a control signal to the voltage compensation component 374 to adjust the resistance of the variable resistor $R_v$ based on the voltage drop $V_{drop}$. For example, the microcontroller 376*a* may control the variable resistor $R_v$ to adjust the resistance of the variable resistor $R_v$ based on the voltage drop $V_{drop}$, in order to adjust the supply voltage $V_{supply}$.

In one aspect, the power delivery component 390*a* may further include the calibration switch component 396*a* that includes include a calibration switch $S_{cal}$ and a calibration resistor $R_{cal}$ connected to the calibration switch. The calibration switch component 396*a* is configured to draw a current through the electrical cable 380 into the power delivery component 390*a* when the calibration switch component 396*a* is activated by activating the calibration switch $S_{cal}$ during an initial calibration, where the calibration switch component 396*a* may be deactivated by deactivating the calibration switch $S_{cal}$ after the initial calibration. The calibration switch component 396 may be connected in parallel to the power meter component 394. For example, the calibration switch $S_{cal}$ and the calibration resistor $R_{cal}$ are connected in series and are connected to the power meter 395 in parallel.

Figure 4:
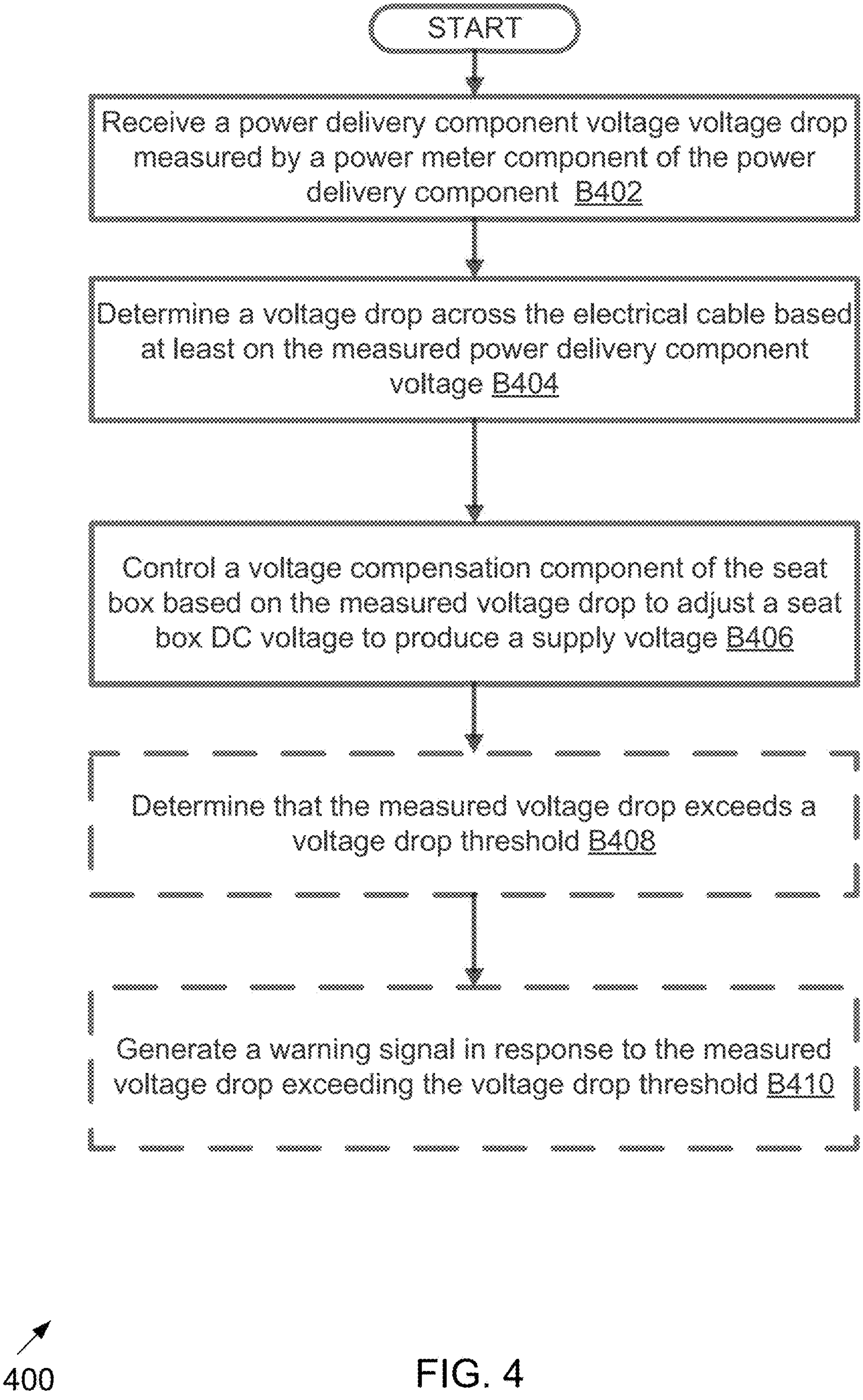
FIG. 4 shows a process flow diagram for performing voltage compensation for power delivery at a passenger seat in a transportation vehicle, according to one aspect of the present disclosure.

Process Flow:

FIG. 4 shows a process 400 for performing voltage compensation for power delivery at a passenger seat in a transportation vehicle, according to one aspect of the present disclosure. The process 400 may be performed by a seat box coupled to the passenger seat, such as the seat box 370 shown in FIG. 3A and FIG. 3B or the seat box 370*a* shown in FIG. 3C. For example, process 400 may be performed by a microcontroller (e.g., microcontroller 376 or 376*a*) of the seat box. As discussed above, the seat box 370 is electrically connected to the power delivery component 390 via an electrical cable 380.

Process 400 begins with block 402, where the seat box 370 receives a power delivery component voltage measured by a power meter component 394 of the power delivery component 390, where the power delivery component 390 comprises a DC power delivery port 392 and the power meter component 390 configured to measure the power delivery component voltage received at the power delivery component 390 via the electrical cable 380. As discussed above, the power meter component 394 of the power delivery component 390 is configured to measure a power delivery component voltage $V_{PD}$ received at the power delivery component 390 via the electrical cable 380, which may be provided to the microcontroller 376 of the seat box 370 The power delivery port 392 included in the power delivery component 390 is used to provide electrical power to an electronic device such as the PED 302.

In block 404, the seat box 370 determines a voltage drop across the electrical cable 380 based at least on the measured power delivery component voltage. As discussed above, The microcontroller 376 is configured to receive the measured power delivery component voltage $V_{PD}$ from the power meter component 394 and determine a voltage drop $V_{drop}$ across the electrical cable 380 between the seat box 370 and the power delivery component 380 based at least on the measured power delivery component voltage $V_{PD}$.

In block 406, the seat box 370 controls a voltage compensation component 374 of the seat box 370 based on the voltage drop to adjust a supply voltage based on the voltage drop, the supply voltage produced by the voltage compensation component 374 and provided to the power delivery component 392 via the electrical cable 380. As discussed above, based on the voltage drop $V_{drop}$ determined by the microcontroller 376, the microcontroller 376 controls the voltage compensation component 374 to adjust the supply voltage $V_{supply}$ based on the voltage drop $V_{drop}$ Here, the seat box 370 includes a DC-to-DC converter 372 configured to convert an initial DC voltage provided to the seat box 370 to the seat box DC voltage, and the voltage compensation component 371 is configured to change the seat box DC voltage to produce the supply voltage to the power delivery component 390. As discussed above, the DC-to-DC converter 372 of the seat box 370 is configured to receive an initial DC voltage $V_i$ from a power source and convert the initial DC voltage $V_i$ to a seat box DC voltage $V_{SB}$ for the seat box 370.

As such, the seat box 370 may consider the voltage drop across the electrical cable to dynamically adjust the supply voltage provided to the power delivery component 390, where the voltage drop may vary based on characteristics (e.g., length, thickness) of the electrical cable. Further, by implementing the DC-to-DC converter 372 and the voltage compensation component 374 in the seat box, a size of the power delivery component 390 may be reduced.

In an aspect, in block 408, the seat box 370 may determine that the voltage drop exceeds a voltage drop threshold. In this aspect, in block 410, the seat box 370 may generate a warning signal in response to the voltage drop exceeding the voltage drop threshold. As discussed above, the microcontroller 376 may determine whether the voltage drop $V_{drop}$ exceeds a voltage drop threshold. If the voltage drop $V_{drop}$ exceeds the voltage drop threshold, the microcontroller 376 may generate a warning signal. By providing the warning signal when the voltage drop exceeds the voltage drop threshold, the seat box 370 may alert a personnel or an operator about a potential faulty condition of the electrical cable, the seat box 370, and/or the power delivery component 390.

Figure 5:
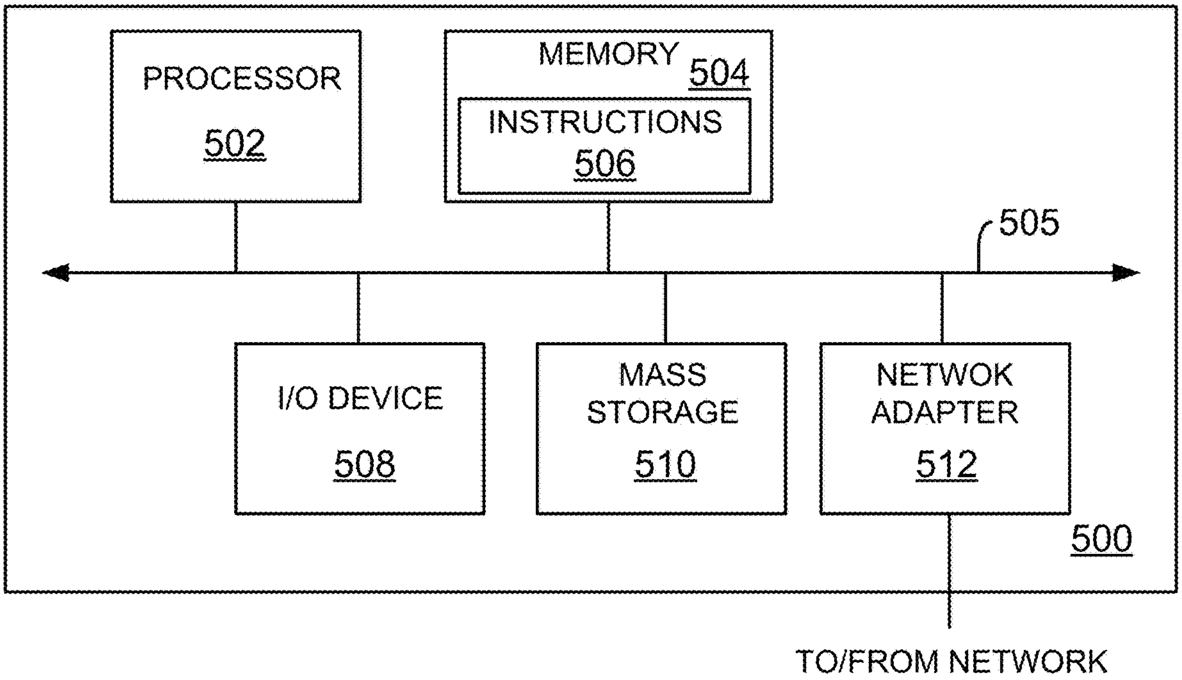
FIG. 5 shows a block diagram of a computing system, used according to one aspect of the present disclosure.

Processing System:

FIG. 5 is a high-level block diagram showing an example of the architecture of a processing system 500 that may be used according to one aspect. The processing system 500 can represent CMD 360, media server 112, computing system 106/107, WAP 130, onboard management system 344, seat device 326, seat box 370, or any user device (PED 302) that attempts to interface with a vehicle computing device. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random-access memory (RAM), read-only memory (ROM), flash memory, or the like, or a combination of such devices. Memory 504 includes the main memory of the processing system 500. Instructions 506 may be used to the process steps of FIG. 4 executed by the microcontroller 376, described above.

Also connected to the processors 502 through the bus system 505 are one or more internal mass storage devices 510, and a network adapter 512. Internal mass storage devices 510 may be or may include any conventional medium for storing large volumes of data in a non-volatile manner, such as one or more magnetic or optical based disks, flash memory, or solid-state drive.

The network adapter 512 provides the processing system 500 with the ability to communicate with remote devices (e.g., over a network) and may be, for example, an Ethernet adapter or the like.

The processing system 500 also includes one or more input/output (I/O) devices 508 coupled to the bus system 505. The I/O devices 508 may include, for example, a display device, a keyboard, a mouse, etc. The I/O device may be in the form of a handset having one or more of the foregoing components, such as a display with a real or virtual keyboard, buttons, and/or other touch-sensitive surfaces.

Thus, methods and systems for managing passenger seat attributes during take-off and/or landing have been described. Note that references throughout this specification to “one aspect” (or “embodiment”) or “an aspect” mean that a particular feature, structure or characteristic described in connection with the aspect is included in at least one aspect of the present disclosure. Therefore, it is emphasized and should be appreciated that two or more references to “an aspect” or “one aspect” or “an alternative aspect” in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A voltage compensation system for power delivery at a passenger seat in a transportation vehicle, comprising:
- a power delivery component coupled to the passenger seat of the transportation vehicle, the power delivery component comprising a direct current (DC) power delivery port configured to provide electrical power to an electronic device and a power meter component configured to measure a power delivery component voltage received at the power delivery component via an electrical cable prior to providing the power delivery component voltage to the DC power delivery port to provide the electrical power; and
- a seat box associated with the passenger seat and electrically connected to the power delivery component via the electrical cable, the seat box configured to provide a supply voltage to the power delivery component via the electrical cable,
- wherein the seat box comprises:
  - a DC-to-DC converter configured to convert an initial DC voltage provided to the seat box to a seat box DC voltage,
  - a voltage compensation component configured to change the seat box DC voltage to produce the supply voltage provided to the power delivery component, and
  - a microcontroller configured to
    - receive the measured power delivery component voltage from the power meter component of the power delivery component,
    - determine a voltage drop across the electrical cable based at least on the measured power delivery component voltage and the supply voltage, and
    - control the voltage compensation component based on the voltage drop to adjust the supply voltage based on the voltage drop.

2. The voltage compensation system of claim 1, wherein the voltage drop is determined by calculating a difference between the supply voltage provided by the seat box at a first end of the electrical cable and the measured power delivery component voltage received at the power delivery component at a second end of the electrical cable.

3. The voltage compensation system of claim 1, wherein the voltage compensation component comprises a variable resistor and a voltage compensation circuit for adjusting the seat box DC voltage to produce the supply voltage based on a resistance of the variable resistor, and
- wherein the resistance of the variable resistor is configured to be adjusted to adjust the supply voltage.

4. The voltage compensation system of claim 3, wherein the microcontroller is configured to control the voltage compensation component based on the voltage drop by transmitting a control signal to the voltage compensation component to adjust the resistance of the variable resistor based on the voltage drop.

5. The voltage compensation system of claim 1, wherein the power delivery component further comprises:
- a calibration switch component configured to draw a current through the electrical cable into the power delivery component when the calibration switch component is activated during an initial calibration,
- wherein the calibration switch component is deactivated after the initial calibration.

6. The voltage compensation system of claim 5, wherein the calibration switch component is connected in parallel to the power meter component, the calibration switch component comprising a calibration switch and a calibration resistor connected to the calibration switch, and
- wherein the calibration switch is configured to draw the current through the electrical cable to the calibration resistor when the calibration switch is activated during the initial calibration.

7. The voltage compensation system of claim 1, wherein the microcontroller is further configured to:
- determine that the voltage drop exceeds a voltage drop threshold, and
- generate a warning signal in response to the voltage drop exceeding the voltage drop threshold.

8. The voltage compensation system of claim 1, wherein the measured power delivery component voltage is received via a serial bus connecting the microcontroller and the power meter component.

9. A seat box for a passenger seat in a transportation vehicle, comprising:
- a seat box component associated with the passenger seat of the transportation vehicle and electrically connected to a power delivery component via an electrical cable, the seat box component being configured to provide a supply voltage to the power delivery component via the electrical cable, the power delivery component comprising a direct current (DC) power delivery port configured to provide electrical power to an electronic device and a power meter component configured to measure a power delivery component voltage received at the power delivery component via the electrical cable prior to providing the power delivery component voltage to the DC power delivery port to provide the electrical power,
- wherein the seat box component comprises:
  - a DC-to-DC converter to convert an initial DC voltage provided to the seat box to a seat box DC voltage;
  - a voltage compensation component to change the seat box DC voltage to produce the supply voltage to the power delivery component; and
  - a microcontroller configured to
    - receive a measured power delivery component voltage from the power meter component of the power delivery component, determine a voltage drop across the electrical cable based at least on the measured power delivery component voltage and the supply voltage, and control the voltage compensation component based on the voltage drop to adjust the supply voltage.

10. The seat box of claim 9, wherein the voltage drop is determined by calculating a difference between the supply voltage provided by the seat box at a first end of the electrical cable and the measured power delivery component voltage received at the power delivery component at a second end of the electrical cable.

11. The seat box of claim 9, wherein the voltage compensation component further comprises a variable resistor and a voltage compensation circuit for adjusting the seat box DC voltage to produce the supply voltage based on a resistance of the variable resistor, and wherein the resistance of the variable resistor is configured to be adjusted to adjust the supply voltage.

12. The seat box of claim 11, wherein the microcontroller is configured to control the voltage compensation component based on the voltage drop by transmitting a control signal to the voltage compensation component to adjust the resistance of the variable resistor based on the voltage drop.

13. The seat box of claim 9, wherein the microcontroller is further configured to:

determine that the voltage drop exceeds a voltage drop threshold, and generate a warning signal in response to the voltage drop exceeding the voltage drop threshold.

14. The seat box of claim 9, wherein the measured power delivery component voltage is received via a serial bus connecting the microcontroller and the power meter component.

15. A method of performing voltage compensation for power delivery at a passenger seat in a transportation vehicle using a seat box associated with the passenger seat and electrically connected to a power delivery component via an electrical cable, the method comprising:

receiving a power delivery component voltage measured by a power meter component of the power delivery component, wherein the power delivery component comprises a direct current (DC) power delivery port configured to provide electrical power to an electronic device and the power meter component configured to measure the power delivery component voltage received at the power delivery component via the electrical cable prior to providing the power delivery component voltage to the DC power delivery port to provide the electrical power;

determining a voltage drop across the electrical cable based at least on the measured power delivery component voltage and a supply voltage, the supply voltage provided by the seat box to the power delivery component via the electrical cable;

controlling a voltage compensation component of the seat box based on the voltage drop to adjust the supply voltage, wherein a DC-to-DC converter of the seat box is configured to convert an initial DC voltage provided to the seat box to a seat box DC voltage, and wherein the voltage compensation component is configured to change the seat box DC voltage to produce the supply voltage to the power delivery component.

16. The method of claim 15, wherein the voltage drop is determined by calculating a difference between the supply voltage provided by the seat box at a first end of the electrical cable and the measured power delivery component voltage received at the power delivery component at a second end of the electrical cable.

17. The method of claim 15, wherein the voltage compensation component further comprises a variable resistor and a voltage compensation circuit for adjusting the seat box DC voltage to produce the supply voltage based on a resistance of the variable resistor, and wherein the resistance of the variable resistor is configured to be adjusted to adjust the supply voltage.

18. The method of claim 17, wherein controlling the voltage compensation component based on the voltage drop comprises transmitting a control signal to the voltage compensation component to adjust the resistance of the variable resistor based on the voltage drop.

19. The method of claim 15, further comprising:

determining that the voltage drop exceeds a voltage drop threshold, and generating a warning signal in response to the voltage drop exceeding the voltage drop threshold.

20. The method of claim 15, wherein the measured power delivery component voltage is received via a serial bus connecting the seat box and the power meter component.

* * * * *